United States Patent [19]

Brautigam

[11] Patent Number: 4,696,508

[45] Date of Patent: Sep. 29, 1987

[54] DEVICE HOLDING SEAT IN RAISED POSITION

[75] Inventor: Peter F. Brautigam, Kewaskum, Wis.

[73] Assignee: Deere & Company, Moline, Ill.

[21] Appl. No.: 892,666

[22] Filed: Aug. 4, 1986

[51] Int. Cl.⁴ .............................................. B62D 25/00
[52] U.S. Cl. .................................. 296/65 R; 297/335; 297/344; 297/355; 180/68.5
[58] Field of Search ............. 296/65 R; 297/335, 344, 297/355, 336, 331, 334, 311, 326, 328; 180/68.5

[56] References Cited

U.S. PATENT DOCUMENTS

| | | | |
|---|---|---|---|
| 3,463,542 | 8/1969 | Daniels | 296/65 R |
| 4,076,302 | 2/1978 | Sable | 296/65 R |
| 4,362,220 | 12/1982 | Baston | 180/68.5 |
| 4,364,602 | 12/1982 | Regazio | 297/335 |
| 4,429,761 | 2/1984 | Haddack | 180/68.5 |
| 4,565,407 | 1/1986 | Brautigam | 297/335 |

*Primary Examiner*—Robert R. Song

[57] ABSTRACT

A vehicle seat positioned on a vehicle over a battery having a battery housing surrounding the battery with the housing including at least one vertical fore-and-aft extending wall positioned alongside the battery. The seat is mounted on a seat frame that can swing vertically about a transverse axis at one end of the frame. The vertical housing wall has a vertical opening therein with opposed vertical edges and with one of those edges having vertical spaced notches therein. An L-shaped latch rod is positioned on the under side of the seat frame and the rod includes a horizontal portion that is journalled on the underside and a vertical portion that extends alongside the housing wall with a lower inwardly extending end that projects into and is adapted for seating in the notches. The opposite end of the horizontal rod portion has a lever thereon that may be utilized to move the lower inwardly extending end out of the notches. A spring extends from the vehicle to the part of the latch rod positioned alongside the housing wall. The spring biases the lower end of the vertical portion of the latch rod into a selected one of the respective notches.

6 Claims, 4 Drawing Figures

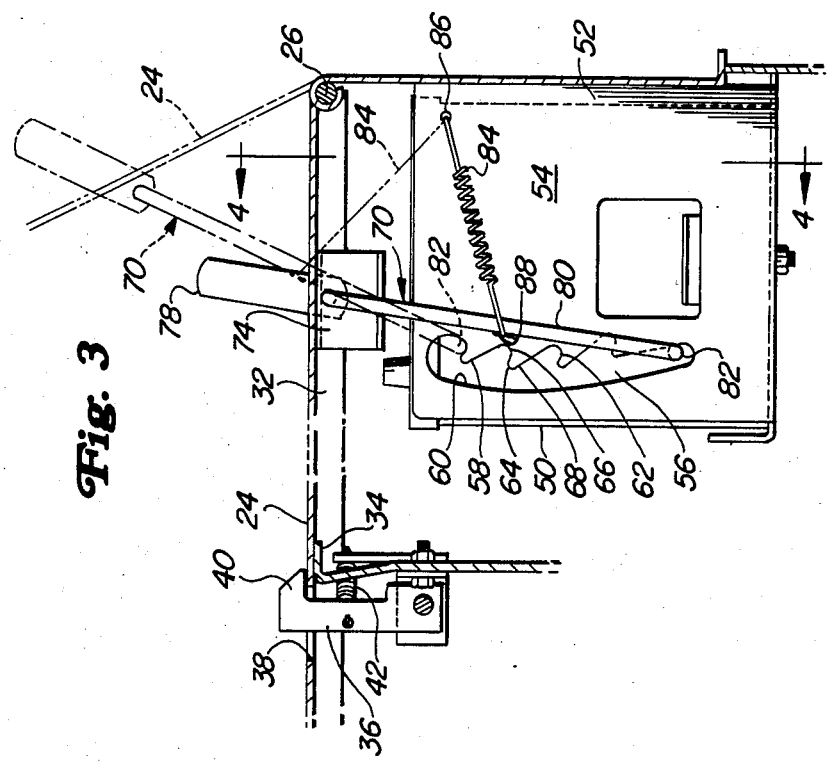
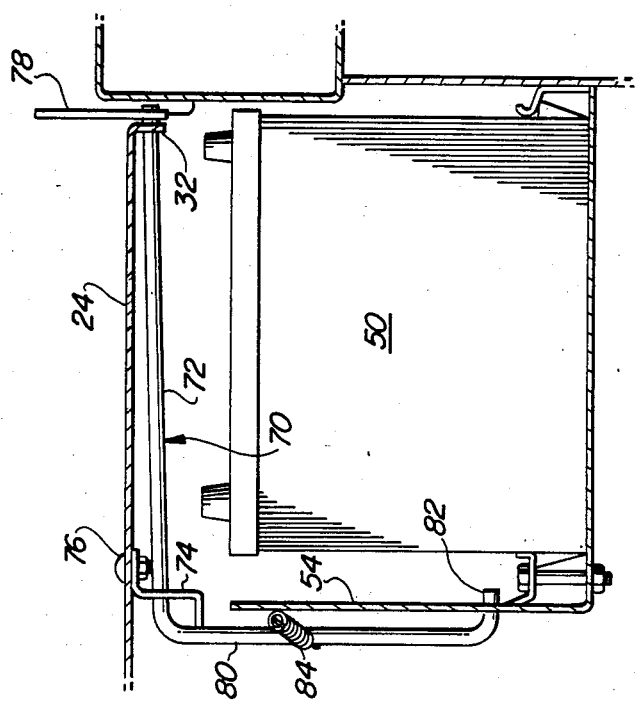

DEVICE HOLDING SEAT IN RAISED POSITION

BACKGROUND OF THE INVENTION

Small tractors, usually of the lawn and garden variety, have become quite sophisticated. Hydraulic systems, electrical systems and transmissions, even of the four wheel drive variety, are now provided on these tractors. A problem associated with providing these features is that there are space limitations on the tractors which make it very difficult to find protective areas for them. Therefore, it is often necessary to use one structure to serve two functions whereas in larger tractors there would be two structures to serve each of the individual functions. An example of this is on a small tractor mounted mower in which the tractor seat may be raised to a position to permit other operating parts of the tractor to be exposed for maintainance and inspection. For example, there may be a transmission or several drive shafts, hydraulic systems and batteries underneath the location of the seat. The seat frame, when raised, provides the only opening through which these parts under the seat can be serviced. The structure for locking the seat in its up position must be very simple and must not create a situation where that structure interferes with other parts of the tractor, particularly when the seat is in its down position.

In a previous U.S. Pat. No. 4,565,407 which issued to the present inventor on Jan. 21, 1986, there is provided a seat holdup mechanism that is mounted on a small tractor. The holdup mechanism consists of a seat frame in the form of a plate that may be moved vertically to open up the area under the seat. Mounted on the underside of the seat frame is a series of teeth that receives the upper end of a latch rod. The lower end of the latch rod is pivotally mounted on the vehicle beneath the seat location. A spring extends between the seat and the rod and tends to hold the upper end of the latch rod into engagement with the teeth. The teeth are formed in a pair of vertical plates spaced apart on the underside of the frame. A rod releasing device extends from these plates outwardly and through the seat frame so that a person may release the rod from the teeth to permit the seat to be lowered.

One of the problems with the seat shown in U.S. Pat. No. 4,565,407 is that the vertical plates that have the teeth cut therein extend downwardly, and when the seat is positioned in its down position, the plates extend into the area of the tractor where other parts of the tractor, such as those mentioned above, may be positioned. Since there is a very limited area on the tractor, these plates take up room which could otherwise be used. Also, the rod that latches the seat in its upper position must also swing in a vertical plane requiring additional clearance. Further, the idea of having teeth exposed with a portion of the rod that may ratchet against those teeth creates somewhat of a hazardous condition and it would be preferable that such teeth not be in the location where a person could place his hands or get clothing caught.

SUMMARY OF THE INVENTION

With the above in mind it is the primary purpose of the present invention to provide a seat holdup device somewhat similar to that shown in U.S. Pat. No. 4,565,407, but in which structure already present on the tractor is used and no new structure is required on the tractor seat other than a small journal plate.

More specifically, it is the purpose of the present invention to utilize a side plate of a battery housing positioned under the seat to serve a second purpose as part of the seat holdup latch mechanism. A vertical opening is provided in the plate and has opposed vertical edges, one of which has vertically spaced notches or teeth therein. An L-shaped latch rod has a horizontal portion positioned and transversely journalled on the underside of the seat frame. The rod has a vertical leg portion with a lower end extending transversely into the opening in the battery plate. A spring extends between the battery housing plate and the vertical portion of the rod and biases the lower transversely extending end of the rod into one of the teeth or notches. The horizontal portion of the L-shaped rod on the underside of the seat frame has at its outermost end a small hand lever, that is rigid with the rod and which may be utilized to force the lower end of the rod out of engagement with a tooth or notch.

BRIEF DESCRIPTION OF THE DRAWINGS

FIG. 3 is a vertical sectional view of a portion of the seat taken alongside the battery housing and showing the latch mechanism for holding the seat in a raised position.

FIG. 4 is a view taken substantially along the line 4—4 of FIG. 3.

DESCRIPTION OF THE PREFERRED EMBODIMENT

Figure 1:
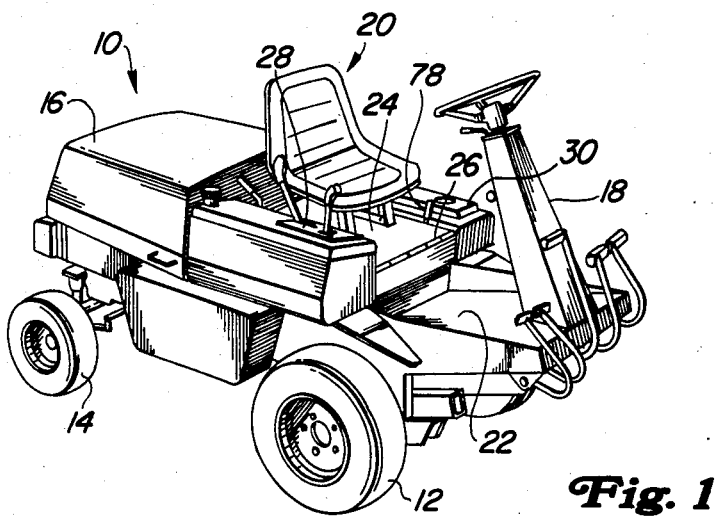
FIG. 1 is a perspective view of a tractor having a seat structure utilizing the latch mechanism of the present invention.

A tractor 10 has a tractor body carried on front traction wheels 12 and rear steerable wheels 14. A tractor engine is provided over the rear steerable wheels, the engine's location being indicated by the engine styling 16. At the forward end of the tractor is a steering post 18 positioned forwardly of a seat structure, indicated in its entirety by the reference numeral 20. The post 18 extends upwardly from a floor or foot panel 22 that is positioned forwardly of the seat 20. The entire seat structure is carried on a seat frame that includes a horizontal seat plate frame 24 that is hinged at 26 to move vertically about a transverse horizontal axis. The seat plate 24 is positioned above the foot panel 22 and forms, with an outer control console 28 on the right side of the seat and a tool carrying compartment 30 on the left side of the tractor, a well that receives the seat structure 20.

The seat plate 24 has a vertical and downwardly extending flange 32 extending around its side and rear edge and when the seat plate 24 is in its lower or operating position, it rests on a ledge 34 which is part of the main frame of the tractor. Latching elements 36 are provided at the rear of the plate 24 and extend through slots 38 in the plate 24. The latching element 36 at its upper end has an upper hook end 40 that hooks over and contacts the upper surface of the plate 24 and holds it in its down position. The upper hook end 40 is held in its latching position by a spring 42 extending between the frame 34 and the latching element 36. When it is desired to raise the plate 24, it is merely necessary to push the latch elements 36 rearwardly until they are positioned to move through the slots 38 and to then manually raise the seat structure 20.

Figure 2:
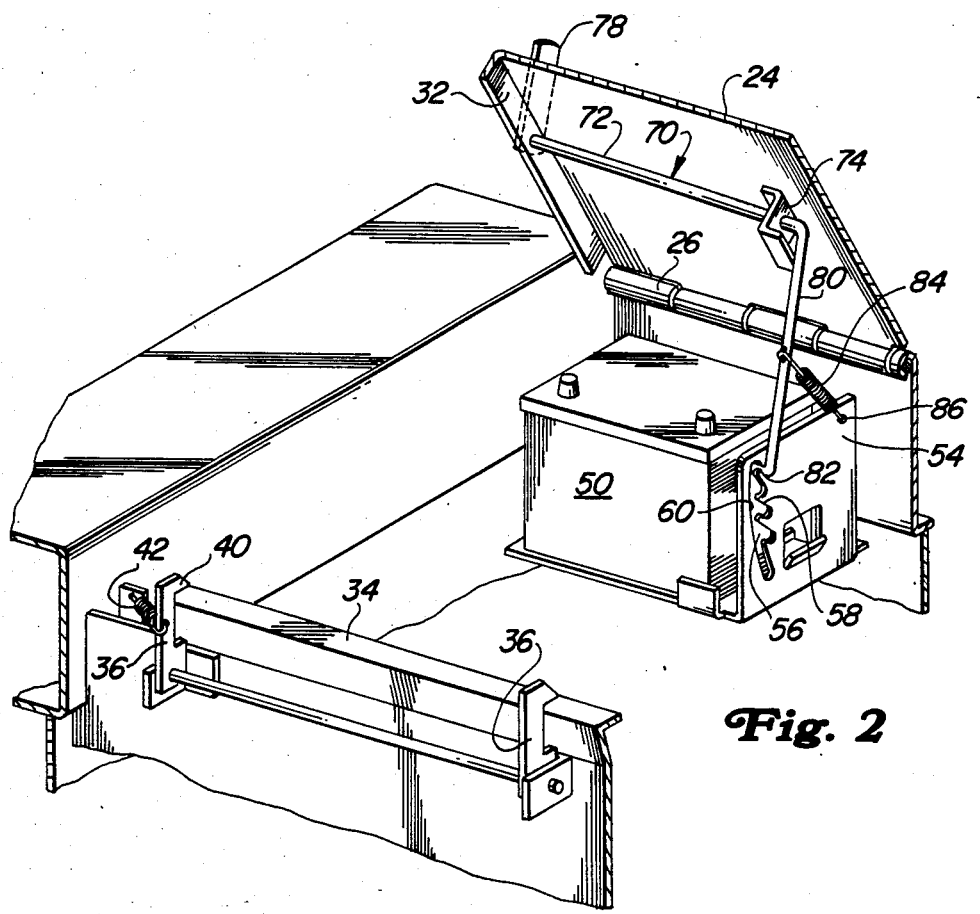
FIG. 2 is a perspective view of the area of the tractor in and about the seat with the seat plate or frame raised to a raised position.

Referring now to FIG. 2, when the seat structure 20 and the seat plate 24 are in the raised position, it gives access to the various tractor parts that are positioned beneath the plate 24. Although not shown, such structure may include a tractor differential, a steering linkage, hydraulic pumps, and a battery 50 and its housing 52. The housing 52 includes a wall 54 on the innermost side of the battery. The wall 54 extends in a fore-and-aft direction and is vertical. The wall or plate 54 has a vertical opening 56 therein with front and rear opposed edges 58 and 60 respectively. Formed in the front edge 58 are a series of vertically spaced notches indicated in their entirety by reference numeral 62. Each of the notches 62 is formed by a convex entry lip 64 that extends forwardly to join a rear portion of a concave section 66 that is lower than its respective lip 64. The notch continues from the concave section 66 to join an upwardly and rearwardly extending inclined section 68 that joins the rear end portion of the convex entry lip 64 of the next higher notch.

An L-shaped latch rod, indicated in its entirety by the reference numeral 70, has an upper horizontal portion 72 extending transversely under the seat plate 24. The portion 72 is journalled on the underside of the plate 24 by means of a journal bracket 74 that is bolted at 76 to the plate 24 and by an opening in the flange 32 that receives the end of the horizontal portion 72. The outermost end of the portion 72 has welded thereto a small lever 78 that extends upwardly from the plate 24 and is positioned outwardly of the flange 32. The purpose of the lever 78 is to manually rock the horizontal portion 72 and the entire latching rod 70 about the axis of the horizontal portion 72. The latch rod 70 also includes a vertical portion 80 that extends downwardly from the portion 72 alongside the battery housing plate 54. The vertical portion 80 has a lower inwardly turned end 82 that projects into the opening 56. As can best be seen in FIG. 3, the diameter of the rod 70 and particularly that of the end 82 is such that it will fit in the respective notches 62. The surface of the portion 82 is substantially the same as the concave portion 66 of the notch 62. Consequently the rod portion 82 may seat itself in the concave portion and since the lip 64 is higher than the concave portion 66, the rod portion 82 may be trapped in that concave portion. A pre-stressed spring 84 extends between the vertical rod portion 80 and a forward end of the plate 54, a small opening 86 being provided in the plate for hooking the end of the spring. A pair of vertically spaced protuberances 88 are provided on the rear side of the rod portion 80 for holding the spring 84 in the propor position on the rod portion 80.

The seat latching mechanism operates in the following manner. When it is desired to raise the seat structure 20 and the plate 24, the latch elements 36 are manually pushed rearwardly until the hook ends 40 are clear of the upper surface of the plate 24. At this time the seat may be easily and manually raised. The lower end portion 82 of latch rod 72 will ratchet along the edge 58 as the seat is being raised. When the seat is raised to its desired position, the spring 84 will force the rod end 82 into one of the notches 62. The weight of the seat as well as the shape of the respective notches 62 will generally trap the rod end portion 82 in the notch 62 where it will be difficult to accidentally release the rod from the notch.

When it is desired to lower the seat, the seat is raised slightly and the lever 78 is pushed forwardly so as to move the rod end 82 clear of the notches. The seat may then be slowly lowered until the plate 24 closes the access opening to the batteries and the other mechanism beneath the seat. It should be noted at this time that the only space needed for this latching structure is that in which the vertical rod portion 80 uses. Since the rod portion 80 will generally be in or close to a vertical position, the fore-and-aft and transverse space required is very little. In the close quarters of the compartment under the seat, this creates a very great advantage since the latching mechanism will not interfere with other structure used on the tractor.

I claim:

1. A vehicle seat positioned over a battery for the vehicle and having a seat frame mounted on the vehicle to swing vertically about a transverse horizontal axis located forwardly of said battery, the improvement comprising: a battery housing including at least one vertical fore-and-aft extending plate positioned alongside the battery and having a vertical opening therein with opposed vertical edges and with the edge facing rearwardly having vertically spaced notches therein, each of said notches being formed by a convex entry lip extending forwardly to join a rear portion of a concave edge section of said notch that is lower than said lip, and continuing from said concave section to an upwardly and rearwardly extending inclined edge section that joins the rearmost end of the convex entry lip of the next higher notch; an L-shaped latch rod having a vertical leg portion positioned alongside said vertical plate with a lower end thereof extending horizontally into said opening and seatable in the concave section of a selected one of the said notches, said L-shaped latch rod having an upper horizontal leg portion journalled on the underside of said seat to rock about a transverse horizontal axis and extending to an end positioned adjacent an edge of the seat; a vertical hand lever rigid with the latter end and extending vertically upwardly for moving said lower end forwardly; and a prestressed spring extending between said vertical leg portion and said fore-and-aft extending plate for biasing said lower end toward said notches and to effect ratcheting of said lower end along said inclined edge sections between said notches and to effect seating in a selected concave edge section when the seat is released as said seat frame is swung vertically.

2. In combination with a seat having an underlying seat frame mounted on a vehicle to swing vertically about a transverse horizontal axis, the improvement comprising: a vertical fore-and-aft extending plate means mounted on the vehicle beneath the seat frame in offset fore-and-aft relation to said horizontal axis and having a vertical opening therein with opposed vertical edges with the edge facing away from said horizontal axis having vertically spaced notches therein; an L-shaped latch rod having a vertical leg portion positioned alongside said vertical plate means with a lower end thereof extending horizontally into said opening and seatable in a selected one of said notches, said L-shaped latch rod having an upper horizontal leg portion journalled on the underside of said seat frame to rock about a transverse horizontal axis and extending to an end positioned transversely adjacent an outer edge of the seat frame; a vertical hand lever rigid with the latter end and extending vertically upwardly above said frame; and a prestressed spring extending between said vertical leg portion and a part of said vehicle for biasing said lower end into a selected one of said notches.

3. The invention defined in claim 2 in which the edges defining each of said notches are formed by a lower entry edge portion convex to the vertical and extending from an outer end to an inner end to join with an outer end of a concave edge portion having a lower extremity offset downwardly from said entry edge portion, said concave portion extending inwardly to join with an upwardly and outwardly inclined edge portion whose upper end joins with the outer end of the next adjacent lower entry edge portion whereby as said seat is raised, said lower end of said latch rod will ratchet along the inclined edge portions to the desired notch.

4. The invention defined in claim 3 wherein the weight of the seat and the biasing force of said prestressed spring will force said lower end of said latch rod into the concave portion of the respective notch said lower end is adjacent when said seat is released.

5. The invention defined in claim 2 in which the vehicle plate means is rigidly mounted on and is a part of said vehicle and the part of said vehicle to which said spring extends to is said vertical plate means.

6. A vehicle seat positioned over a battery for the vehicle and mounted on the vehicle to swing vertically about a transverse horizontal axis and located fore-and-aft of said battery, the improvement comprising: a battery housing including at least one vertical fore-and-aft extending plate positioned alongside the battery and having a vertical opening therein with opposed vertical edges and with the edge facing away from said horizontal axis having vertically spaced notches therein; an L-shaped latch rod having a vertical leg portion positioned alongside said vertical plate with a lower end thereof extending horizontally into said opening and seatable in a selected one of said notches, said L-shaped latch rod having an upper horizontal leg portion journalled on the underside of said seat to rock about a transverse horizontal axis extending to and positioned transversely adjacent an edge of the seat; a vertical hand lever rigid with the latter end and extending vertically upwardly; and a prestressed spring extending between said vertical leg portion and said vehicle for biasing said lower end into a selected one of said notches.

* * * * *